United States Patent [19]

Lauro

[11] Patent Number: 5,388,853
[45] Date of Patent: Feb. 14, 1995

[54] LOCK MECHANISM FOR A COLLAPSIBLE STROLLER

[75] Inventor: Charles W. Lauro, Southern Pines, N.C.

[73] Assignee: Kolcraft Enterprises, Inc., Chicago, Ill.

[21] Appl. No.: 43,223

[22] Filed: Apr. 6, 1993

[51] Int. Cl.6 .............................................. B62B 3/02
[52] U.S. Cl. ................................ 280/642; 280/647; 280/658; 403/93
[58] Field of Search .................. 280/642, 644, 647 X, 280/649, 651, 657, 658; 403/65, 83, 84, 85, 88, 96, 92, 93 X; 297/16, 20, 21, 25, DIG. 4

[56] References Cited

U.S. PATENT DOCUMENTS

| 2,347,754 | 5/1944 | Shay . | |
|---|---|---|---|
| 4,023,825 | 5/1977 | Kassai | 280/649 |
| 4,126,331 | 6/1977 | Sloan et al. | 280/655 |
| 4,856,809 | 8/1989 | Kohus et al. | 280/644 |
| 4,993,743 | 2/1991 | Takahashi et al. | 280/642 |
| 4,997,154 | 3/1991 | Little | 280/647 |
| 5,087,066 | 2/1992 | Mong-Hsing | 280/644 |
| 5,106,116 | 4/1992 | Chen | 280/642 |
| 5,205,579 | 4/1993 | Kato et al. | 280/642 |

FOREIGN PATENT DOCUMENTS

| 48803 | 3/1988 | France | 280/642 |
|---|---|---|---|
| 2179897 | 3/1987 | United Kingdom | 280/642 |

Primary Examiner—Richard M. Camby

[57] ABSTRACT

A collapsible baby stroller with an improved lock mechanism for preventing accidental collapse is disclosed. The lock mechanism comprises two separate engagements which must be disengaged before the lock is released, thereby enhancing safety. A locking member which rotates about one tube of the stroller first must be disengaged from a pin against the bias of a spring before the locking member can be disengaged from another tube. Only after both precautions are exercised can the tubes of the stroller move relative to each other to effect collapse.

19 Claims, 2 Drawing Sheets

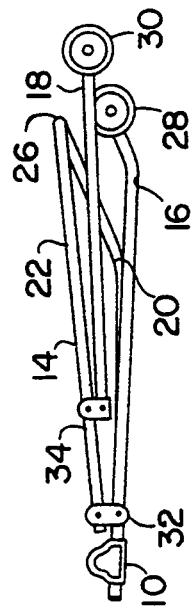
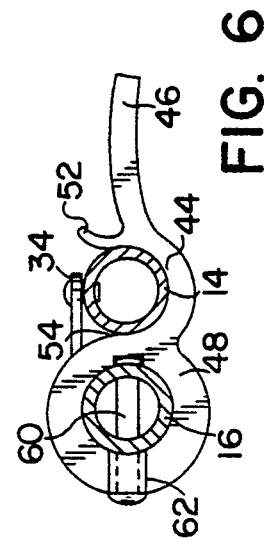
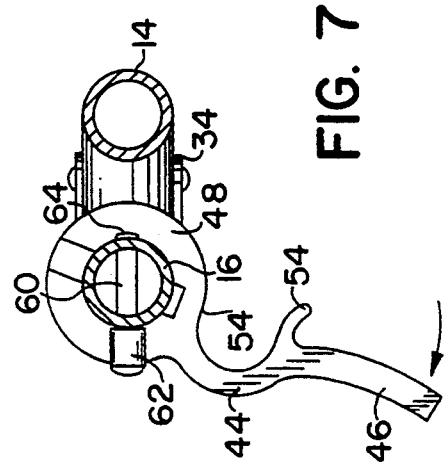
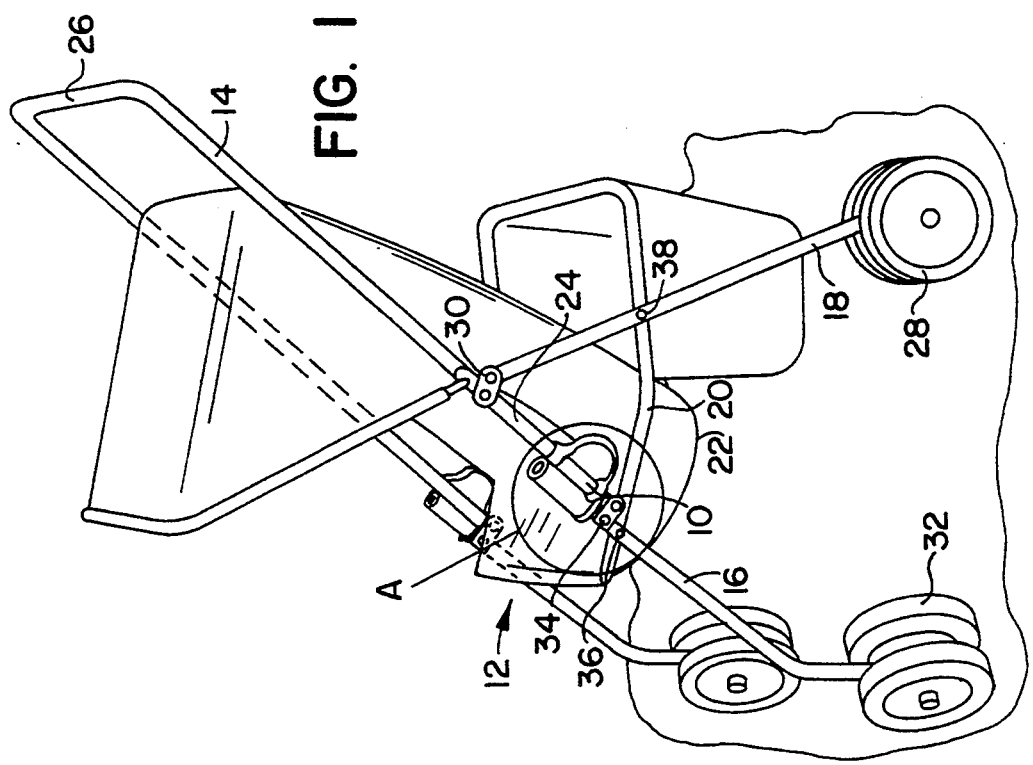

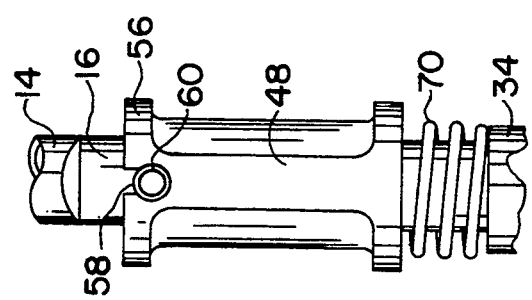
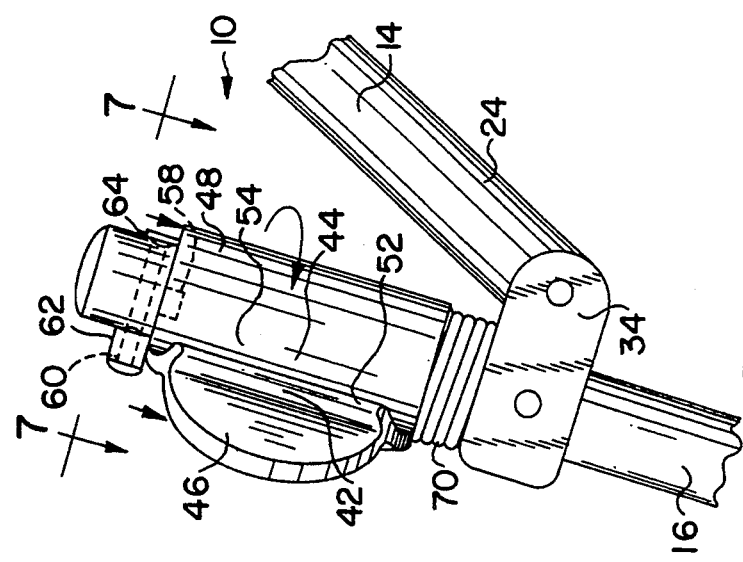
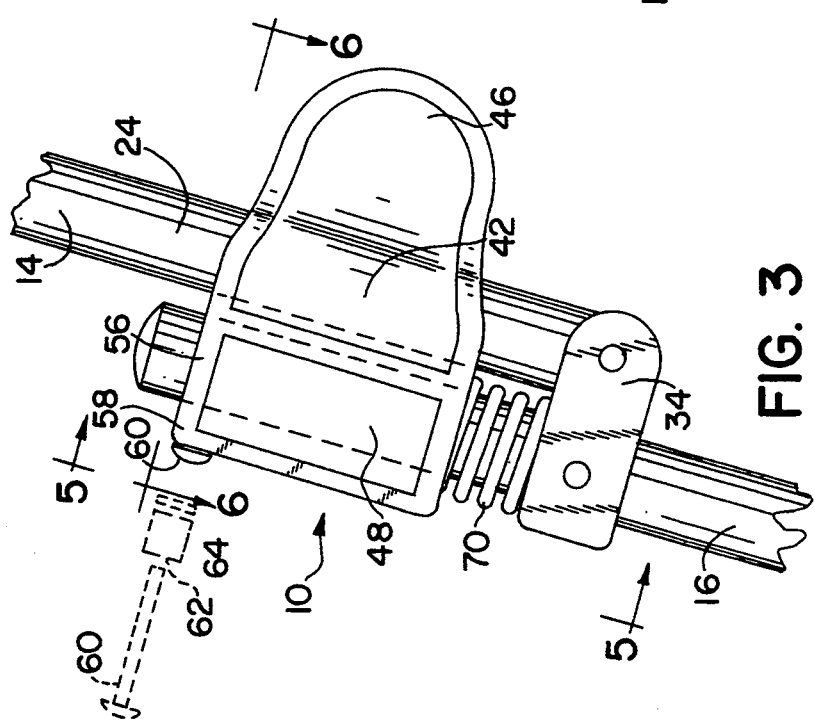

LOCK MECHANISM FOR A COLLAPSIBLE STROLLER

FIELD OF THE INVENTION

The present invention relates in general to a lock mechanism which is intended to minimize the risk of accidental collapse of a collapsible stroller. The lock mechanism is structured to release only when it is moved sequentially in two different orientations. Hence, only a calculated effort will unlock the lock mechanism.

BACKGROUND OF THE INVENTION

Collapsible strollers are designed to collapse from an erect position for receiving and supporting a child to a compact folded position for storage and portability. These strollers are popular for their convenience. However, because the strollers are capable of collapsing, they present the possibility of accidental collapse while a child is in the stroller. Such an accident could result in injury to the child.

In an attempt to eliminate the risk, lock mechanisms have been installed on these strollers to restrain them from accidental collapse. Improvements to the prior lock mechanisms have not been completely successful because they entail motion in one direction or require a single step to release the lock mechanism. Consequently, these improved lock mechanisms are still subject to accidental collapse. Applicant's improved lock mechanism is superior to prior lock mechanisms because it is intended to release only after purposefull two-step manipulation.

An object of this invention is to provide an improved lock mechanism for a collapsible baby stroller which minimizes the risk of accidental collapse.

Another object of the invention is to provide an improved lock mechanism for a collapsible baby stroller which requires two distinct steps to unlock.

SUMMARY OF THE INVENTION

In accordance with a preferred embodiment of the invention, a collapsible baby stroller with an improved lock mechanism, which is intended to minimize accidental collapse, is disclosed. The lock mechanism minimizes the possibility of accidental release by requiring the lock to be manipulated in two distinct directions before it will release. In essence, the lock mechanism utilizes two separate engagements, each of which must be disengaged before the lock is opened or unlocked.

Typically, collapsible strollers are of a tubular construction, but other forms of cylindrical shafts may be used. The tubes are connected to each other by hinges which permit the tubes to fold over each other. This folding action facilitates the erection of the stroller to an erect condition and collapse of the stroller to a collapsed condition. When in use, the stroller is maintained in the erect position by at least one lock mechanism which locks the tubes in alignment.

The lock mechanism of this invention acts on a first stroller tube and a second stroller tube which are coupled together by a hinge. The lock mechanism includes a locking member which has a handle, a sleeve for rotatably and slidably mounting the locking member on the first stroller tube, a slot in the sleeve, and a receptacle. A fixed pin projects outwardly from the first stroller tube, and a spring biases the locking member toward the pin.

To lock the mechanism, the locking member is manually rotated about the first tube by use of the handle until the receptacle securely engages the second tube. Simultaneously, the slot on the locking member and the static pin align, and the spring urges the slot to engage the pin. When engaged, the pin prevents the locking member from rotating about the second tube.

To unlock the lock mechanism, two steps must be performed. First, the locking member must be pushed against the bias of the spring to allow the slot to disengage from the pin. When the slot clears the pin, the second step then can be performed. The handle is then used to rotate the locking member to disengage the clasp from the second tube. Only at this point will the lock mechanism be opened and the first tube be allowed to fold at the hinge over the second tube to achieve the collapsed condition.

The primary advantage of this invention is that two separate steps must be performed before the lock mechanism is opened. The necessity of performing two disengagement steps will minimize the risk of inadvertent stroller collapse, thereby enhancing the safety of collapsible strollers.

BRIEF DESCRIPTION OF THE DRAWINGS

In the detailed description of the preferred embodiment of the invention presented below, reference is made to the accompanying drawings, in which:

FIG. 1 is a perspective view of a preferred embodiment of an operative side of a stroller employing a new and improved lock mechanism, which is in a closed position to maintain the stroller in an erect condition, in accordance with this invention.

FIG. 2 is a side elevational view of the stroller of FIG. 1, in a collapsed condition.

FIG. 3 is a enlarged segmented side elevational view of the lock mechanism, encircled at "A" of FIG. 1, in the closed position.

FIG. 4 is an enlarged segmented side elevational view of the lock mechanism, encircled at "A" of FIG. 1, in an opened position.

FIG. 5 is an enlarged sectional front view taken substantially along line 5—5 of FIG. 3.

FIG. 6 is an enlarged sectional view taken substantially along line 6—6 of FIG. 3.

FIG. 7 is an enlarged sectional view taken substantially along line 7—7 of FIG. 4.

DESCRIPTION OF THE PREFERRED EMBODIMENT

A preferred embodiment of the new and improved lock mechanism 10 as used on a collapsible stroller 12 of the invention is illustrated in FIGS. 1-7. Because the stroller 12 is substantially symmetrical, reference will be made only to an operative side in the detailed description. A cooperative side of the stroller has substantially the same structure as the operative side and functions parallel to and in cooperation with said operative side.

To move the stroller from an erect condition of FIG. 1 to a collapsed condition of FIG. 2, it will be understood that both the operative and cooperative sides of the stroller 12 must be manipulated. However, the lock mechanism 10 can be employed on only the operative side of the stroller or, preferably, on both the operative and the cooperative sides of the stroller.

FIG. 1 shows an erect stroller 12 with the lock mechanism 10 (circled area "A") in the closed or locked position. The stroller 12 is supported by an interconnected elongated tubular frame consisting of tubes 14, 16, 18 and 20 and has a seat 22 to accommodate a child. The tubes 14, 16, 18 and 20 can be made of any durable material such as metal or synthetic resin and may be solid or hollow.

A first tube 14 has a lever end 24 and extends up to support a generally U-shaped handle bar 26. The handle bar 26 is used for pushing and guiding stroller 12.

A back tube 18 extends down from first tube 14 to support back wheels 28. Tubes 14 and 18 are coupled by a U-shaped hinge 30. First tube 14 is statically fixed to the hinge 30, and back tube 18 is pivotally fixed to the hinge 30. Hence, back tube 18 pivots about the hinge 30. The hinge 30 is fastened to tubes 14 and 18 by a rivet and pin assembly in a conventional and well known manner.

First tube 14 overlaps a second tube 16 at a lever end 24 and second tube 16 extends down to support front wheels 32. Tubes 14 and 16 are coupled by a U-shaped hinge 34. Second tube 16 is statically fixed to the hinge 34, and first tube 14 is pivotally fixed to the hinge 34. Hence, first tube 14 pivots about the hinge 34. The hinge 34 is fastened to tubes 14 and 16 by a conventional rivet and pin assembly.

A seat tube 20 is pivotally coupled by pins 36 and 38 to tubes 16 and 18, respectively. Accordingly, tubes 16, 18 and 20 pivot about pins 36 and 38. Pins 36 and 38 are also secured in place with a rivet.

When the lock mechanism 10 is opened or unlocked, first tube 14 pivots about the hinge 30 to fold down over back tube 18. As the handle bar 26 of tube 14 drops down, the lever end 24 of first tube 14 pivots up and about back tube 18 at the hinge 30. Consequently, the lever end 24 lifts up on the hinge 34 causing second tube 16 to pivot about the hinge 34 and fold toward tubes 14 and 18. The folding process is complete when wheels 28 and 30 and the handle 26 all collapse together to achieve a compact collapsed condition as shown in FIG. 2.

To erect the stroller 12 it is unfolded out of the collapsed condition. First tube 14 is pivoted away from second tube 16, causing the stroller 12 to expand until the erect condition is achieved.

The lock mechanism 10 is mounted on second tube 16 above the hinge 34, as shown best in FIGS. 3 and 4. When in the closed position as shown in FIGS. 1, 3, 5 and 6, the lock mechanism 10 restrains first tube 14 from pivoting about the hinge 34 and maintains tubes 14 and 16 in alignment.

FIGS. 3 and 6 show the locking member 42 of the lock mechanism 10 in the closed position. FIGS. 4 and 7 show the locking member 42 in the open position. The lock mechanism 10 is preferably made of a resilient synthetic resinous material and has a unitary structure, but other materials and structures may be used.

The locking member 42 as shown in FIG. 6 includes a receptacle 44, extends into a handle 46 at one end and a cylindrical sleeve 48 at the other end. The sleeve 48 is coaxial with second tube 16 to rotatably and slidably mount the locking member 42 on second tube 16. The receptacle 44 has a finger 52 which is opposite to a side 54 of the sleeve 48. The finger 52 coacts with said side 54 to receive first tube 14 into the receptacle 44. The handle 46 is manipulated to rotate the locking member 42 about second tube 16, so the receptacle 44 encounters said first tube 14. The handle 46 is then used to press the finger 52 and the coacting side 54 into releasable and slidable engagement with first tube 14. Consequently, the locking member 42 restrains first tube 14 from pivoting about the hinge 34.

The sleeve 48 has a top 56 into which a slot 58 is formed, as shown in FIG. 5. A pin 60 is fixed through the diameter of second tube 16 and projects outwardly from second tube 16. A cylindrical spacer 62 surrounds a projecting portion of the pin 60, as shown in FIG. 3. The pin 60 is secured through a diameter of second tube 16 with a rivet 64, as shown in FIGS. 3, 6 and 7. The slot 58 is dimensioned to snugly receive pin 60.

A coil compression spring 70 is positioned around second tube 16, between the hinge 34 and the locking member 42, as shown in FIGS. 3, 4 and 5. The spring 70 urges the locking member 42 toward the pin 60. The lock mechanism 10 is configured to align the slot 58 with the pin 60 when the clasp 44 engages first tube 14, as shown in FIGS. 3 and 6. Upon alignment, the spring 70 urges the locking member 42 toward the pin 60, so that the slot 58 releasably engages the pin 60. Consequently, the locking member 42 is restrained from rotating about second tube 16, thereby preventing the receptacle 44 from disengaging from first tube 14. The lock mechanism 10 is thus in a closed or locked position.

To open the lock mechanism 10, two steps must be performed. First, the locking member 42 must be pushed downwardly against the bias of spring 70 to disengage the slot 58 from the pin 60. Once the slot 58 is clear of the pin 60, the pin 60 no longer restrains rotation of the locking member 42. Next, the handle 46 is then used to rotate the locking member 42 about second tube 16 to disengage the receptacle 44 from first tube 14 as shown in FIG. 7. Only after these two steps are performed, will the lock mechanism 10 be in an open or locked position, and first tube 14 be allowed to pivot about the hinge 34 to permit the folding of stroller 12 into the collapsed condition.

To close or lock the lock mechanism 10, the reverse steps are performed. The stroller 12 is unfolded into the erect condition shown in FIG. 1. The handle 46 is used to rotate the locking member 42 to securely engage first tube 14. As the receptacle 44 is pressed into secure engagement with first tube 14, the slot 58 and the pin 60 align, and the spring 70 urges the slot 58 upward to engage the pin 60. As the pin 60 restrains rotation of the locking member 42, tubes 14 and 16 will be maintained in alignment as shown in FIGS. 1, 3 and 6. Consequently, lock mechanism 10 is in the closed position and maintains stroller 12 in the erect condition.

The invention has been described in detail with particular reference to a preferred embodiment. However, it will be understood that variations and modifications can be effected within the spirit and scope of the invention as described hereinabove and as set forth in the claims.

What is claimed is:

1. A collapsible stroller having a tubular construction which supports a seat, a handle bar and a plurality of wheels comprising:
   (a) an operative pair of first and second elongated tubes and a cooperative pair of first and second elongated tubes, said cooperative pair is configured to function parallel to and in cooperation with said operative pair;
   (b) hinge means which movably couple said first tubes to said second tubes;

(c) a locking member being rotatably and slidably connected to said operative second tube, said locking member rotates to releasably engage said operative first tube to maintain alignment of said first tubes relative to said second tubes; and (d) a restraining means which releasably restrains rotation of said locking member, thereby requiring a separate disengagement of said locking member from said restraining means and said locking member from said first operative tube in order to allow said first operative and cooperative tubes to move relative to said second operative and cooperative tubes, respectively, and collapse said stroller.

2. The collapsible stroller of claim 1, wherein said locking member includes a sleeve through which said second operative tube is rotatably and slidably mounted.

3. The collapsible stroller of claim 2, wherein said locking member has a receptacle with a resilient finger opposite to a side of said sleeve, so when said locking member rotates and said receptacle encounters said first operative tube, said finger coacts with said side to releasably engage said first operative tube within said receptacle.

4. The collapsible stroller of claim 3, further comprising a slot in said sleeve of said locking member, and said restraining means includes a pin fixed to said second operative tube, said slot being adapted to releasably engage said pin to restrain rotation of said locking member.

5. The collapsible stroller of claim 4, wherein said locking member includes a spring which urges said slot in said locking member to engage said pin when said receptacle on said locking member rotates to engage said first operative tube.

6. The collapsible stroller of claim 5, wherein said spring is a compression spring which is positioned around said second operative tube between said hinge and said locking member.

7. The collapsible stroller of claim 1, wherein said first operative tube is pivotally connected to said hinge means, so that said first operative tube pivots relative to said second operative tube when said locking member is disengaged from said first operative tube.

8. The collapsible stroller of claim 1, wherein said locking member has a handle which is used to move said locking member to releasably engage said first operative tube.

9. The collapsible stroller of claim 1, wherein said locking member is of a unitary construction.

10. The collapsible stroller of claim 9, wherein said locking member is made of a resilient material.

11. A collapsible stroller having a tubular construction which supports a seat, a handle bar and a plurality of wheels comprising:

(a) an operative pair of first and second elongated tubes and a cooperative pair of first and second elongated tubes, said cooperative pair is structured to function parallel to and in cooperation with said operative pair;

(b) hinge means which pivotally couple said first tubes to said second tubes;

(c) a fixed pin projecting outwardly from said second operative tube;

(d) a locking member including a sleeve with a side and a slot in said sleeve, a receptacle with a resilient finger which is opposite to said side, said sleeve is coaxial with said second tube, so said locking member slidably and rotatably mounts said second tube, upon rotation of said locking member said receptacle encounters said first operative tube, and said resilient finger coacts with said side of said sleeve to releasably engage said first operative tube to maintain alignment of said first tubes relative to said second tubes; and (f) a spring which biases said slot in said sleeve to engage said fixed pin when said receptacle on said locking member engages said first operative tube to restrain said locking member from rotating, thereby necessitating both disengagement of said slot from said pin and disengagement of said receptacle from said first operative tube to permit said first operative and cooperative tubes to pivot out of alignment with said second operative and cooperative tubes and collapse said stroller.

12. The collapsible stroller of claim 11, wherein said spring is positioned around said second tube between said hinge means and said locking member.

13. The collapsible stroller of claim 12, wherein said locking member is of a unitary construction.

14. The collapsible stroller of claim 13, wherein said locking member is made of a resilient material.

15. A lock mechanism for a collapsible stroller which maintains alignment of a first stroller frame tube with a second stroller frame tube, said first stroller frame tube is coupled by a hinge to said second stroller frame tube, said second stroller frame tube has a fixed pin projecting outwardly therefrom, said lock mechanism including:

(a) a locking member having a sleeve with a slot therein, a receptacle with a resilient finger opposite to a side of said sleeve, said sleeve coaxially accommodates said second stroller frame tube to rotatably and slidably mount said locking member about said second tube, upon rotation of said locking member so said receptacle encounters said first tube, said finger coacts with said side of said sleeve so said receptacle releasably engages said first tube to maintain alignment of said first tube with said second tube; and (b) a spring which biases said slot in said locking member to releasably engage said pin when said receptacle engages said first tube to restrain rotation of said locking member, thereby necessitating disengagement of said locking member from said pin, rotation about said second tube, and separate disengagement of said receptacle from said first tube, to permit disruption of alignment of said first tube with said second tube.

16. The lock mechanism of claim 15, wherein said locking member is of a unitary construction.

17. The lock mechanism of claim 16, wherein said locking member is made of a resilient material.

18. The lock mechanism of claim 17, wherein said locking member has a handle for manually rotating said locking member about said second tube and pressing said receptacle into a releasable engagement with said first tube.

19. A two-step lock mechanism for releasably holding two hinged members in alignment, said mechanism comprising:

(a) a first elongated tube;

(b) a second elongated tube;

(c) a hinge means mounted near one end of said second tube and connected to one end of said first tube;

(d) said second tube having a restraint means fixedly secured thereto and extending outwardly from said second tube;
(e) a handle means rotatably and slidably carried by said second tube and disposed between said hinge means and said restraint means;
(f) an engaging means on said handle means for engaging said restraint means, whereby upon engagement said handle means is precluded from rotation about said second tube;
(g) a bias means for urging said handle means into locking engagement with said restraint means; and
(h) said handle means includes a receptacle for releasably and slidably engaging said first tube when said first and second tubes are in alignment to maintain said tubes in alignment, whereby to open said lock mechanism said engaging means must first be disengaged to permit said receptacle to disengage from said first tube after which said handle means may be rotated away from said second tube to permit said second tube to pivot about said hinge means.

* * * * *